Nov. 11, 1941.　　　　A. B. NEWTON　　　　2,262,194
TEMPERATURE CONTROL SYSTEM
Filed April 1, 1938
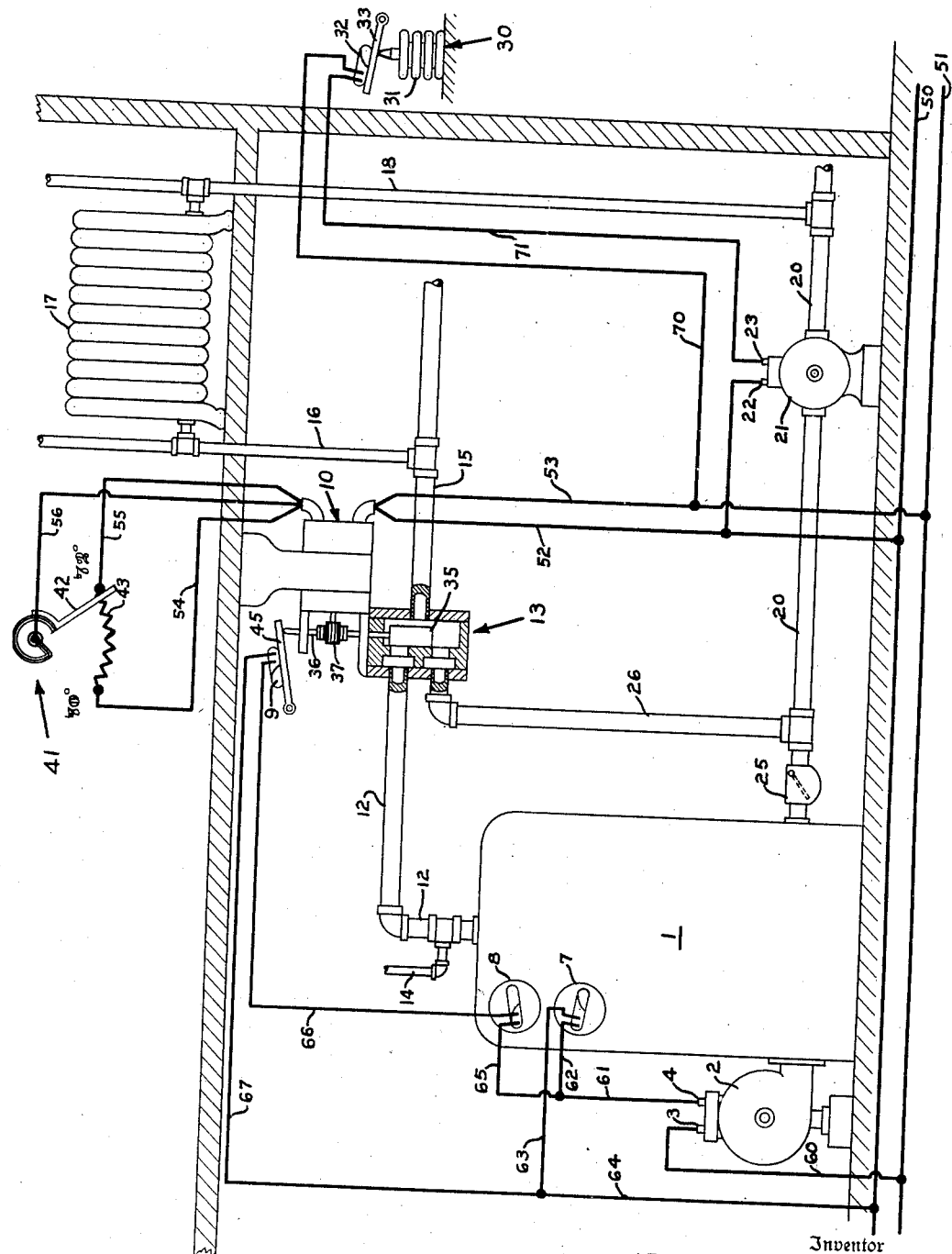
Inventor
*Alwin B. Newton*
By
*George H Fisher*
Attorney Patented Nov. 11, 1941

2,262,194

UNITED STATES PATENT OFFICE 2,262,194

TEMPERATURE CONTROL SYSTEM

Alwin B. Newton, Minneapolis, Minn., assignor to Minneapolis-Honeywell Regulator Company, Minneapolis, Minn., a corporation of Delaware Application April 1, 1938, Serial No. 199,459

11 Claims. (Cl. 237—8)

My invention relates generally to the art of heating control and is more particularly concerned with improvements in temperature control systems for buildings.

The object of my invention is the provision of a simple but effective control arrangement for maintaining buildings properly heated under various load conditions occasioned by changes in outdoor weather.

My invention further has as an object the provision of a heating system combining the employment of a gravity and forced circulation of heating medium so as to increase the capacity of the system in a manner to compensate for increased loads.

Another object of my invention is the provision of a heating system and control therefor employing a circulator for the heating medium responsive to outdoor temperature so arranged as to boost the capacity of the system when the outdoor temperature falls. In conjunction with my particular circulator control I employ high and low limit boiler temperature responsive controls between which the control shifts dependently upon an indoor thermostatic device and an outdoor temperature responsive circulator control device in a manner whereby the capacity of the system is progressively increased as the load increases. It will be understood that at ordinary outdoor temperatures an indoor thermostat may control heating satisfactorily but when outdoor temperatures fluctuate appreciably an indoor thermostat alone cannot compensate for such changes in load. My objective is therefore to provide simple apparatus for varying the capacity of a heating system in correspondence with a substantial range of loads whereby I may maintain the indoor temperature very close to a desired predetermined value irrespective of the load.

A further object of my invention is the provision of a hot water heating system controlled by a room thermostat having high and low limit boiler temperature responsive switches in control of a burner, an auxiliary switch controlled by the room thermostat for shifting control of the burner from one limit switch to the other and an outdoor thermostat for controlling a circulator.

A further object of my invention is the provision of a hot water heating system having a bypass controlled by a room thermostat and a water circulator controlled by an outdoor thermostat operable to start the circulator at a predetermined temperature.

Other objects and purposes of my invention will become apparent to those skilled in the art from the accompanying drawing and written description.

The single figure of the drawing represents diagrammatically a hot water heating system utilizing one embodiment of my invention.

Referring to the drawing, numeral 1 represents a furnace or boiler forming a part of a hot water heating system employed for heating a building. Heat for the boiler is supplied by an electrically driven oil burner 2 of a conventional type having electrical terminals 3 and 4 for connection to electrical conductors which supply power to the oil burner. The oil burner 2 may be controlled by mercury switches 7, 8, and 9, the mercury switches 7 and 8 being actuated by a thermostatic element responsive to the temperature of the boiler water. The mercury switch 7 energizes the oil burner at a predetermined low limit of the boiler water temperature and normally operates to maintain the boiler water at a substantially constant temperature. The thermostatic device which actuates the switches 7 and 8, as mentioned, closes the circuit through switch 7 at a predetermined temperature and at a predetermined relatively higher temperature opens the switch 8. The switch 8 may act as a high limit switch if a circuit therethrough is completed through the mercury switch 9. The manner of control by these mercury switches and their electrical wiring will be more fully pointed out in the description of operation later.

The boiler 1 has a riser 12 which connects to a by-pass proportioning valve generally indicated at 13. A small branch connection 14 from the riser 12 connects to an expansion tank (not shown) as conventionally used in hot water heating systems. Leading from the proportioning valve 13 is a distributing header 15 from which branch connections such as that shown at 16 lead to radiators which may be located at various points in the building as shown at 17. Numeral 20 represents a return header for conveying water from the various radiation points in the building back to the boiler for reheating. Return connections such as the connecting pipe 18 lead from the radiators and connect to the return header 20 as shown. Interposed in the return header is an electrically driven circulator 21 having electrical terminals 22 and 23 and serving to circulate the water throughout the entire system. The return header 20 connects through a check valve 25 to the lower part of the boiler and has a branch connection 26 which leads to the proportioning valve 13 and is connected thereto in a manner similar to the riser 12. The check valve 25 prevents heated water in the boiler from backing up into the return header 20.

The by-pass proportioning valve 13 is of a three-way type, the pipe connections 12 and 26 forming inlets thereto and the supply header 15 forming the outlet therefrom. The inlet openings to the valve 13 are controlled by a valve member 35 which is connected to a rack 36 meshing with a pinion gear 37. The position of the valve member 35 adjusts the proportions of water circulated through the boiler and by-passed through the connection 26. The pinion gear 37 for moving the rack 36 may be driven by a proportioning motor diagrammatically indicated at 10 which may be of the type shown and described in detail in United States Patent No. 2,028,110 of Taylor granted January 14, 1936. The proportioning motor 10 is controlled by an indoor thermostat generally indicated at 41 in a manner corresponding to the manner of control described in the Taylor patent. The thermostatic device 41 is of the conventional bimetallic element type and has a slider 42 arranged to slide over a slide wire resistance 43. Movement of the slider 42 over the resistance 43 adjusts the resistances in the circuits of the relay windings forming a part of the proportioning motor and causes it to move in one direction or the other as described in the Taylor patent. It will be seen that the rack 36 extends so as to engage the end of a lever 45 which actuates the mercury switch 9. When the rack 36 has moved downwardly to a predetermined position, the mercury switch 9 will be tilted sufficiently to cause closure of its contacts. Closure of the contacts of the mercury switch 9 takes place at a predetermined position of the valve member 35 when the room temperature has deviated a certain amount from a desired value as will become more clear from the description of operation following.

Numeral 30 represents a thermostatic switch responsive to outdoor temperatures. This thermostatic device comprises an expansible bellows 31 of conventional construction arranged to tilt a mercury switch 32 by means of an actuating lever 33. The thermostatic device 30 is arranged so as to close the contacts of the mercury switch 32 at a predetermined outdoor temperature. The outdoor thermostat controls the circulator 21 and the manner of control and electrical wiring will be more clearly set forth in the description of operation later.

For the purpose of explaining the sequence of operation of my control system, I have shown my device with the parts in the position they assume when the indoor temperature is at 72° and the outdoor temperature is at some value above 65°. The circulator 21 is not operating and the boiler temeprature is not low enough to cause closure of mercury switch 7. Power for the entire system is supplied from line conductors 50 and 51 connected to a suitable source of power, the proportioning motor 10 being supplied with power through conductors 52 and 53 connected to the line conductors 50 and 51, respectively. It will be seen that the slider 42 of thermostat 41 is at the extreme right end of resistance 43 and that the valve member 35 is positioned so as to completely close off the pipe 12. Now, should the room temperature fall, either by reason of the opening of doors or windows or because of a fall in outdoor temperature, the slider 42 will be moved to the left along resistance 43 cutting out resistance in the circuit of wire 54 which connects the left end of resistance 43 to the proportioning motor and placing more resistance in the circuit of wire 55 which connects the right end of resistance 43 to the proportioning motor. This unbalances the parallel circuits formed by these wires and the center wire 56 which connects the thermostat 41 to the proportioning motor. The result of the unbalancing of the circuits causes the proportioning motor to move in a direction to move the valve member 35 downwardly so as to reduce the proportion of water by-passed through pipe 26 and to permit water to be circulated from the boiler through pipe 12 and throughout the system by gravity. For purposes of describing the complete sequence of operation of my system, let it be assumed that the outdoor temperature was at a value of 65° or above when movement of the slider 42 began and that it now continues to steadily fall. As the outdoor temperature falls, obviously the heating load is increased and the indoor temperature will continue to fall. As slider 42 moves to the left progressively, greater amounts of water will be circulated through the boiler and through the system for increasing heating.

Whenever the boiler water temperature falls below the predetermined value for which switch 7 is set, this switch will close completing a circuit through the oil burner 2 which is as follows: from the line conductor 51 through a wire 60 to terminal 3 of the oil burner, from terminal 4 to wire 61, to wire 62, to mercury switch 7, and wire 63, to wire 64, and back to line conductor 50.

When the room temperature has fallen to 71.5°, the valve member 35 will have uncovered the port communicating with pipe 12 twenty-five per cent of its maximum opening. Under these circumstances, the outdoor temperature will normally have fallen to a value of 60°, for example, and the rack 36 will have moved downwardly sufficiently so that mercury switch 9 will close completing the following circuit to the oil burner 2: through wires 60, 61, and 65 to mercury switch 8, through wire 66 from mercury switch 8 to mercury switch 9, from mercury switch 9 through wire 67 and wire 64 back to line conductor 50. Thus it is seen that when mercury switch 9 is closed the oil burner 2 is placed under control of the mercury switch 8 so that the boiler water is continuously heated and a predetermined high value is reached at which mercury switch 8 will open. Thus under these conditions higher boiler water temperatures prevail in order to compensate for the heavier heating demands occasioned by the outdoor temperature. Whenever the said predetermined limit of boiler water temperature is reached the oil burner is stopped by opening of mercury switch 8.

By reason of the increased boiler water temperatures now prevailing the indoor temperature may rise slightly but will then again fall as the outdoor temperature progressively decreases. Accordingly valve member 35 will be positioned downwardly so as to increase the flow of water through the boiler in accordance with the room temperature. When the outdoor temperature has fallen to a value which may be 55°, for example, the mercury switch 32 will close completing the circuit to the circulator 21 which is as follows: from wire 53 which connects the line conductor 51 through wire 70 to the mercury switch 32, from mercury switch 32 through wire 71 to terminal 23 of the circulator 21 from terminal 22 of the circulator back to the wire 52 which connects to line conductor 50. Thus, whenever the outdoor temperature is below 55°, for example, there is an enforced circulation of water through the entire system caused by circulator 21. A greater volume of water is therefore circulated to all the radiators under these conditions and the greater amount of heat supplied compensates for the heavier load due to falling outdoor temperatures. By reason of the increased rate of circulation and consequent augmented capacity of the system the room temperature will now rise above 71½° to 71¾°, for example, with control of burner 2 being removed from switch 8 and shifted back to switch 7. Operation of the circulator 21 augments the capacity of the system substantially and the outdoor temperature may now fall considerably, to 30°, for example before the room temperature will again fall to 71½° at which control of the burner 2 will again be shifted to switch 8. When this occurs increased boiler water temperatures will again prevail. As the outdoor temperature continues to fall the slider 42 will move to the left along resistance 43 and at an outdoor temperature of 0°, for example, will be at the extreme left end of resistance 43, the room temperature now being at 70° as indicated on the drawing. Under these conditions the thermostat 41 will have caused the proportioning motor 10 to move the valve member 35 downwardly so as to open the port communicating with the pipe 12 to a 100% opening permitting all the circulating water to be passed to the boiler and none to be by-passed. The system is now operating at maximum capacity with forced circulation and with the burner 2 under control of the high limit switch 8 and with by-pass 26 completely sealed off. It will be understood that when the outdoor temperature is above the predetermined value of 55° as mentioned for example the circulation of water throughout the system is by gravity only and is sufficient to adequately heat the building when the outdoor temperature is above this value. I have described the sequence of operation of my system over a wide range of outdoor temperatures and the complete operating range of temperature of the indoor thermostat. It is to be understood of course, that upon a rise in outdoor temperature the above described sequence of operation transpires in the reverse order and that normally when the outdoor temperature is settled the indoor thermostat will maintain a predetermined corresponding value in accordance with that described above.

From the foregoing it is apparent that the heating capacity of my system is progressively increased as the load increases so that the indoor temperature is maintained within a very narrow range throughout a wide range of outdoor temperatures. Due to the particular nature of my control arrangement it is sufficiently flexible to accommodate itself to a wide range in loads as determined by outdoor temperatures whereas in usual systems controlled by an indoor thermostat only a small range of ordinary outdoor temperatures can be accommodated with the same degree of satisfaction. I accomplish the objects of my invention and the advantageous results following therefrom in a novel manner without the employment of complex or expensive control mechanism in a system which is comprised of only very simple, inexpensive, and reliable types of equipment. Due to the particular manner in which I employ the various control instruments and devices disclosed I produce at least four changes in the capacity of the system with corresponding proportionate rates of heating. These changes are brought about automatically by reason of the manner in which I control my circulator so that the control of the burner may be shifted from one limit switch to the other before the circulator is put in operation and may be again shifted after the circulator is put in operation.

Considerable fuel economies may be gained by my particular type of system and operation and at a minimum of initial cost for control equipment. The system has many advantages which render it adaptable to numerous applications and which because of its extreme simplicity may be readily utilized and applied to various types of present existing systems.

There are many variations, modifications, and forms which the present invention may take and it is to be understood that the disclosed embodiment is to be interpreted only as illustrative and that the invention is to be limited only determined as by the appended claims.

I claim as my invention:

1. In a heating system in combination, a boiler including heat generating means, means for circulating water between said boiler and spaces being heated, means responsive to space temperature for controlling the circulation, boiler temperature responsive means for controlling said heat generating means, and means operable at a predetermined space temperature for assuming control over said heat generating means whereby a different boiler temperature may be maintained depending upon the space temperature, and outdoor temperature responsive means for causing forced circulation of said water when outdoor temperature falls below a predetermined value.

2. In a heating system, in combination, a boiler including heat generating means, means for circulating water between said boiler and spaces being heated, means responsive to space temperature for by-passing part of said water, boiler temperature responsive means for controlling said heat generating means to maintain a predetermined boiler water temperature, and means rendered effective whenever a predetermined proportion of boiler water is mixed with the by-pass water to control said heat generating means for maintaining a higher boiler temperature.

3. In a temperature control system, in combination, a temperature changing means, means providing for gravity circulation of a heat transporting medium between said temperature changing means and a region whose temperature is to be controlled as long as the load on said system is at a relatively low value, means responsive to the temperature of said region for controlling its temperature by by-passing variable amounts of said medium around said temperature changing means, and means causing a forced circulation of said medium to increase the capacity of the system as a result of an increase in the load beyond said value.

4. In a heating system, in combination, a boiler, a heating fluid in said boiler, means for heating said fluid, temperature responsive means in said boiler in control of said means for maintaining said fluid at a predetermined temperature, a space to be heated, means providing for a gravity circulation of said fluid between said boiler and said space, means responsive to space temperature for actuating the heating means for raising the temperature of the heating fluid to a relatively high value, and means responsive to outdoor temperature for forcibly circulating the heating fluid, the arrangement being such that when the space and outdoor temperatures are above predetermined values the heating fluid is at a minimum temperature and may circulate by gravity, if the space temperature is below its said predetermined value and the outdoor temperature above its said predetermined value the temperature of the heating fluid is high and it circulates by gravity, if the space temperature is above its said predetermined value and the outdoor temperature below its said predetermined value the heating fluid is at a minimum temperature and is forcibly circulated, and if both the space temperature and outdoor temperatures are below their said predetermined values the heating fluid temperature is high and the fluid is forcibly circulated.

5. In a heating system, a device for heating a heat conveying medium, a space to be heated, means providing for the gravity circulation of said medium to said space and back again, a space thermostat for controlling the temperature of the heating medium delivered to said space for maintaining said space temperature constant, and means responsive to outside temperature for forcibly increasing the circulation of said medium when the outside temperature decreases to such a value that the increase in circulation is necessary in order to properly heat said space.

6. In a heating system, in combination, a boiler including heat generating means, means for circulating water between said boiler and spaces being heated, means responsive to space temperature for by-passing part of said water, boiler temperature responsive means for controlling said heat generating means to maintain a predetermined boiler water temperature, means rendered effective whenever a predetermined proportion of boiler water is mixed with the by-passed water to control said heat generating means for maintaining a higher boiler water temperature, and outdoor temperature responsive means for increasing the rate of circulation of water between said boiler and spaces being heated.

7. In a heating system, a space to be heated, means including a heating device for controlling the temperature of a heat conveying medium, said medium being capable of gravity circulation from said controlling means to said space and return, a space thermostat in control of said controlling means for regulating the temperature in said space, a circulator for forcing circulation of said heat conveying medium, and outdoor temperature responsive means for energizing said circulator whenever the outdoor temperature falls below a value below which the temperature of said space cannot be maintained at its desired value by the gravity circulation of the heating medium.

8. In a temperature control system, in combination, temperature changing means, means providing for circulation of a heat transporting medium between said temperature changing means and a region wherein the temperature is to be controlled, valve means controlling the circulation of said heat transporting medium, means opening said valve proportionately to the value of temperature in said region, and means causing forced circulation of heat transporting medium when the outdoor temperature falls below that value at which said region can be adequately heated by gravity circulation of said heat transporting medium.

9. In a temperature control system, in combination, temperature changing means, means providing for circulation of a heat transporting medium between said temperature changing means and a region wherein the temperature is to be controlled, means for by-passing a portion of said heat transporting medium around said temperature changing means, a by-pass valve for varying the proportion of the medium which is by-passed, means opening said valve proportionately to the value of temperature in said region, and means causing forced circulation of heat transporting medium when the outdoor temperature falls below that value at which said region can be adequately heated by gravity circulation of said heat transporting medium.

10. In a heating system, in combination, a boiler including heat generating means, means for circulating water between said boiler and spaces being heated, a by-pass around said boiler for a portion of the water, a valve controlling the relative flow through said boiler and by-pass, means opening said valve proportionately to the temperature in said spaces being heated, boiler temperature responsive means for controlling said heat generating means to maintain a predetermined boiler water temperature, and means rendered effective at a predetermined space temperature to control said heat generating means for maintaining a higher boiler temperature.

11. In a heating system, a device for heating a heat conveying medium, a space to be heated, piping means providing for the gravity circulation of said medium from said heating device to said space and back again, circulating means which, when energized, forcibly circulates the heat conveying medium through said piping means, but when deenergized does not interfere substantially with the gravity circulation of said medium, means including a temperature responsive device in said space controlling the temperature of the heat conveying medium for maintaining the temperature in said space at a desired value, and means responsive to outdoor weather conditions for maintaining the circulating means energized when the load on the heating system is heavy, but deenergizing said circulating means while the load is such that it is still necessary to deliver heat to said space to maintain it at its desired value but sufficient heat can be delivered by gravity circulation of the heat conveying medium.

ALWIN B. NEWTON.